(12) United States Patent
Kim

(10) Patent No.: US 12,494,546 B2
(45) Date of Patent: Dec. 9, 2025

(54) BATTERY MODULE HAVING WAVE TYPE GAUGE BAR

(71) Applicant: SEOYON E-HWA CO., LTD., Anyang (KR)

(72) Inventor: Sung Su Kim, Suwon (KR)

(73) Assignee: SEOYON E-HWA CO., LTD., Anyang (KR)

( * ) Notice: Subject to any disclaimer, the term of this patent is extended or adjusted under 35 U.S.C. 154(b) by 487 days.

(21) Appl. No.: 18/162,500

(22) Filed: Jan. 31, 2023

(65) Prior Publication Data

US 2023/0282930 A1 Sep. 7, 2023

(30) Foreign Application Priority Data

Mar. 7, 2022 (KR) .......................... 10-2022-0028524

(51) Int. Cl.
*H01M 50/383* (2021.01)
*H01M 50/242* (2021.01)

(52) U.S. Cl.
CPC ....... *H01M 50/383* (2021.01); *H01M 50/242* (2021.01)

(58) Field of Classification Search
CPC ............. H01M 50/383; H01M 50/242; H01M 10/425; H01M 10/488; H01M 2200/00; H01M 10/48; H01M 2220/20; H01M 50/209; H01M 50/249; H01M 50/204; H01M 50/569
See application file for complete search history.

(56) References Cited

U.S. PATENT DOCUMENTS

| | | | | |
|---|---|---|---|---|
| 10,559,792 | B1* | 2/2020 | Combs | H01M 50/249 |
| 2018/0254443 | A1* | 9/2018 | Liao | B60K 1/04 |
| 2019/0319234 | A1* | 10/2019 | Cordani | H01M 10/66 |
| 2022/0271395 | A1* | 8/2022 | Hwang | H01M 50/291 |
| 2023/0198092 | A1* | 6/2023 | Lee | H01M 50/211 |
| | | | | 429/149 |

FOREIGN PATENT DOCUMENTS

| | | |
|---|---|---|
| EP | 3264517 A1 | 1/2018 |
| KR | 10-2017-0027074 A | 3/2017 |
| WO | 2017090866 A1 | 6/2017 |

OTHER PUBLICATIONS

A Review of lithium-ion battery fire suppression.
The Office Action issued by the Indian Patent Office on Oct. 23, 2024.
A Review of lithium-ion battery fire suppression, Published Oct. 1, 2020.

\* cited by examiner

*Primary Examiner* — Stewart A Fraser
(74) *Attorney, Agent, or Firm* — Harvest IP Law, LLP

(57) ABSTRACT

Disclosed herein is a battery module including a battery pack in which battery cells for an electric vehicle are formed in the form of a bundle, wave type gauge bars which are disposed on both side surfaces of the battery pack and in which a plurality of valleys and ridges are formed, and a fire extinguishing support disposed between the gauge bar and the battery pack.

8 Claims, 4 Drawing Sheets

[FIG. 1]
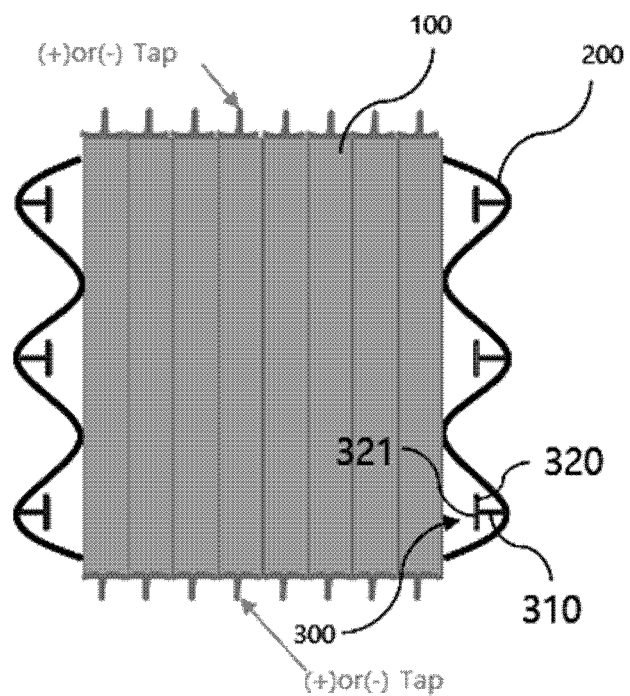

[FIG. 2]
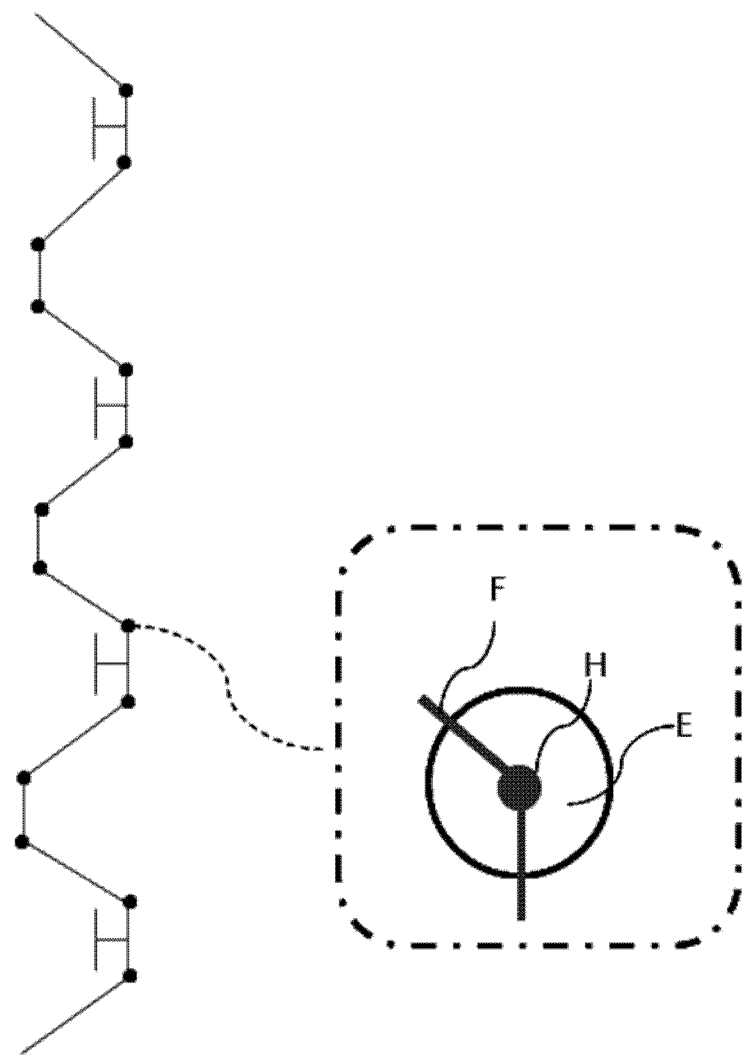

[FIG. 3]
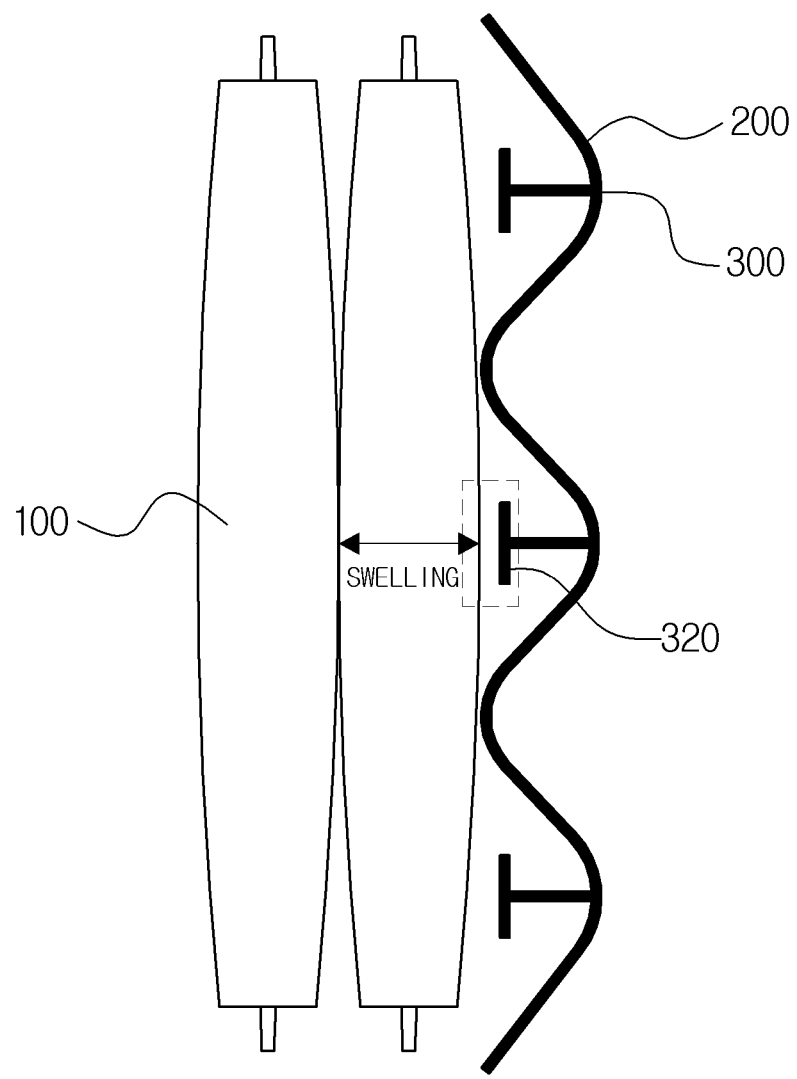

[FIG. 4]
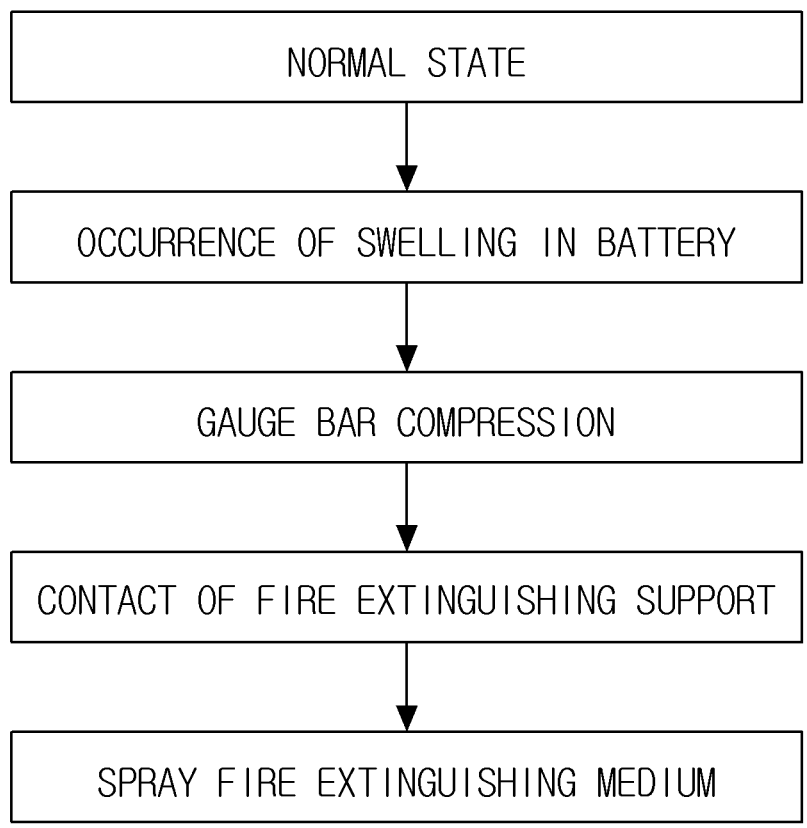

BATTERY MODULE HAVING WAVE TYPE GAUGE BAR

CROSS-REFERENCE TO RELATED APPLICATION

This application claims priority to and the benefit of Korean Patent Application No. 10-2022-0028524, filed on Mar. 7, 2022, the disclosure of which is incorporated herein by reference in its entirety.

BACKGROUND

1. Field of the Invention

The present invention relates to a battery module for an electric vehicle to which a wave type gauge bar is applied.

2. Discussion of Related Art

When a battery cell which is a basic unit constituting a battery module is charged or discharged at a high speed, heat is generated and a swelling phenomenon occurs on a surface portion of the battery cell. When the swelling occurs in the battery cell, a phenomenon in which a surface pressure between battery cells in the battery module increases occurs. As described above, the battery cell in which the swelling phenomenon has occurred cannot function normally due to an opening of a vent portion, or fire problems such as short circuits occur and thus efforts are needed to prevent the above problems.

RELATED ART DOCUMENT

Patent Document (Patent Document) Korean Patent Laid-Open Application No. 10-2017-0027074 (published on Mar. 9, 2017)

SUMMARY OF THE INVENTION

The present invention is directed to a battery module which prevents fire by managing a degree of swelling of a battery through a fastening pressure of the module fixing and fastening bar without changing a shape or adding a component constituting the battery module.

However, technical problems to be solved by the embodiments of the present invention are not necessarily limited to the above-described technical problems. Other technical problems that are not described will be clearly understood by those skilled in the art to which the embodiments of the present invention pertains from other descriptions of the specification, such as the detailed description.

According to an aspect of the present invention, there is provided a battery module including a battery pack in which battery cells for an electric vehicle are formed in the form of a bundle, wave type gauge bars which are disposed on both side surfaces of the battery pack and in which a plurality of valleys and ridges are formed, and a fire extinguishing support disposed between the gauge bar and the battery pack.

BRIEF DESCRIPTION OF THE DRAWINGS

The above and other objects, features and advantages of the present invention will become more apparent to those skilled in the art by describing exemplary embodiments thereof in detail with reference to the accompanying drawings, in which:

FIG. 1 is a schematic diagram illustrating a battery module in a normal state according to one embodiment of the present invention;

FIG. 2 is a diagram illustrating a modified example of a gauge bar;

FIG. 3 is a diagram illustrating an operating state when a swelling phenomenon occurs in the battery module of the present invention; and FIG. 4 is a flowchart illustrating an operation of the battery module of the present invention.

DETAILED DESCRIPTION OF EXEMPLARY EMBODIMENTS

Hereinafter, embodiments of the present invention will be described with reference to the accompanying drawings. The following embodiments may be provided to more fully describe the present invention to those skilled in the art. It should be noted, however, that the following embodiments are merely provided to help understanding of the present invention, and the technical spirit of the present invention is not limited by the following embodiments. In addition, detailed descriptions of known components or components that obscure the technical gist of the present invention will be omitted herein.

FIG. 1 is a schematic diagram illustrating a battery module in a normal state according to one embodiment of the present invention.

Referring to FIG. 1, the battery module according to the present embodiment may include a battery pack 100 in which battery cells for an electric vehicle are formed in the form of a bundle, wave type gauge bars 200 which are disposed on both side surfaces of the battery pack 100 and in which a plurality of valleys and ridges are formed, and a fire extinguishing support 300 disposed between the gauge bar 200 and the battery pack 100.

The battery module according to the present embodiment may include the battery pack 100. The battery pack 100 may have a form in which a plurality of battery cells are coupled. Here, the battery pack 100 is used for an electric vehicle and may be disposed inside a battery case (not shown) to be mounted in the electric vehicle. In addition, the battery pack 100 may be a device in which positive (+) taps and negative (−) taps are formed on both sides of the battery pack 100 to supply electricity.

In addition, the battery module may include the gauge bars 200 disposed on the side surfaces of the battery pack 100. The gauge bar 200 may be formed in a wave type bar in which a plurality of valleys and ridges are formed. The wave type of the gauge bar 200 may be a form in which periods and amplitudes of the valleys and ridges are sufficiently variable according to a size and a shape of the battery module. In addition, the form of the gauge bar 200 may be formed as a wave type formed as an extension of a general curve, but the present invention is not necessarily limited to such a form.

FIG. 2 is a diagram illustrating a modified example of the gauge bar 200.

Referring to FIG. 2, the gauge bar 200 according to the modified example may have a curved form in which a plurality of straight paths forming valleys and ridges are bent. In the gauge bar 200 having such a form, since a straight path is formed, an operation of setting heights of the valleys and the ridges may be facilitated compared to the gauge bar 200 formed in a streamline shape.

In addition, a curved portion of the gauge bar 200 according to the modified example may be formed of an elastic material E. Here, the portion formed of the elastic material E may apply an elastic force to the gauge bar 200. In the gauge bar 200 to which an elastic force is applied, a force which restores the gauge bar 200 after the gauge bar 200 is moved by an external force may be formed. Such a gauge bar 200 may have movement which changes to a straight line or wave type according to action and release of an external force. In addition, the elastic material E, which is at a position at which the gauge bar 200 according to the modified example is bent, may be formed in a spherical shape.

In addition, the gauge bar 200 may have a form in which a hinge H and a frame F are disposed inside the elastic material E. Such a gauge bar 200 may perform a bending operation by the hinge H and may be easily restored by the elastic material E.

Referring to FIG. 1, the battery module according to one embodiment of the present invention may include the fire extinguishing support 300. The fire extinguishing support 300 may be disposed between the battery pack 100 and the gauge bar 200. In addition, the fire extinguishing support 300 may be located such that a support side 310 comes into contact with one side of the gauge bar 200. The fire extinguishing support 300 may be formed in a "T"-shaped cross section.

In addition, the fire extinguishing support 300 may have a contact portion 320 formed on a surface opposite to the support side 310.

The contact portion 320 may be disposed to face the battery pack 100. In addition, a switch 321 may be formed on an outer surface of the contact portion 320 facing the battery pack 100. When the switch 321 comes into contact with the battery pack 100, the switch 321 may be a device for operating a fire extinguishing medium to be sprayed.

FIG. 3 is a diagram illustrating an operating state when a swelling phenomenon occurs in the battery module of the present invention.

Referring to FIG. 3, when a swelling phenomenon occurs in the battery pack due to overcharging or overdischarging, one side may expand as shown in FIG. 3. Such an expansion phenomenon may cause an increase in a surface pressure between the battery cells. Accordingly, the vent portion of the battery cell may be opened and not be able to perform a normal function or a fire problem may occur due to the problem of a short circuit. Thus, in response to the expansion of the battery pack 100, one side of the gauge bar 200 is pressed in the form of a wave type so that the gauge bar 200 according to one embodiment of the present invention may be deformed in the form of a straight line. In this case, along with the deformation of the gauge bar 200, the fire extinguishing support 300 disposed in contact with one side of the gauge bar 200 may be moved toward the battery pack 100. When the fire extinguishing support 300 is moved toward the battery pack 100 and thus the contact portion 320 comes into contact with the battery pack 100, the fire extinguishing medium may be sprayed to form a fire extinguishing atmosphere inside the battery module. The fire extinguishing medium may be sprayed through the fire extinguishing support 300, and in some cases, a signal may be transmitted to allow the fire extinguishing medium to be sprayed from a separately provided fire extinguishing device. Thus, according to the battery module of the present invention, a preventive operation may be performed so that fire due to a swelling phenomenon does not occur.

FIG. 4 is a flowchart illustrating an operation of the battery module of the present invention.

Referring to FIGS. 1 to 4, when the battery module is overcharged or overdischarged, a swelling phenomenon of a battery may occur. Due to the swelling phenomenon, the battery pack 100 may be formed in the form in which one side expands as shown in FIG. 3. The expanded side of the battery pack 100 may come into contact with one side of the wave type gauge bar 200. Here, a force due to the expansion of the battery pack 100 may be applied to the gauge bar 200 as a compressive force. Accordingly, the gauge bar 200 may be deformed from a wave type to a straight line form. Due to the operation in which the form of the gauge bar 200 is deformed, the fire extinguishing support 300 in contact with and coupled to one side of the gauge bar 200 may move toward the battery pack 100. In this way, the moved fire extinguishing support 300 may come into contact with a surface pressure support disposed on one side surface of the battery pack 100 or one side thereof. In this case, due to contact of the contact portion 320 formed on the fire extinguishing support 300, the fire extinguishing medium may be sprayed. Accordingly, a fire extinguishing atmosphere may be formed in the battery pack 100.

As described above, a battery module according to the embodiments of the present invention can measure a degree of swelling through an elastic flow of a gauge bar formed in a wave type to spray a fire extinguishing medium, thereby preventing fire due to swelling of the battery module.

A battery module according to the embodiments of the present invention can measure a degree of swelling through an elastic flow of a gauge bar formed in a wave type to spray a fire extinguishing medium, thereby preventing fire due to swelling of the battery module.

However, the technical effects obtainable through the embodiments of the present invention are not necessarily limited to the above-described effects. Other technical effects that are not described will be clearly understood by those skilled in the art to which the present invention pertains from other descriptions of the specification, such as the detailed description.

Although embodiments of the present invention have been described above, various modifications or changes of the present invention can be achieved by adding, changing, or deleting components within the scope of the present invention by those skilled in the art without departing from the spirit of the present invention described in the appended claims, and these modifications or changes fall within the scope of the present invention.

What is claimed is:

1. A battery module comprising:
   a battery pack (100) in which battery cells for an electric vehicle are formed in a form of a bundle;
   wave type gauge bars (200) which are disposed on both side surfaces of the battery pack (100) and in which a plurality of valleys and ridges are formed; and
   a fire extinguishing support (300) disposed between each of the gauge bars (200) and the battery pack (100).

2. The battery module of claim 1, wherein, when each of the gauge bars (200) expands and comes into contact with the battery pack (100), each of the gauge bars (200) is deformed in a straight line form.

3. The battery module of claim 1, wherein the fire extinguishing support (300) includes:
   a support side (310) in contact with and coupled to each of the gauge bars (200); and a contact portion (320) disposed to face the battery pack (100), wherein a switch (321) is formed on an outer surface of the contact portion (320) facing the battery pack (100), and the switch (321) operates when the switch (321) comes into contact with one side of the battery pack (100).

4. The battery module of claim 3, wherein the fire extinguishing support (300) sprays a fire extinguishing medium through the operation of the switch (321) so that a fire extinguishing atmosphere is formed in the battery pack (100).

5. The battery module of claim 3, wherein the fire extinguishing support (300) is formed in a T-shaped cross section.

6. The battery module of claim 1, wherein each of the gauge bars (200) is formed in a curved shape such that a plurality of straight paths form the plurality of valleys and ridges.

7. The battery module of claim 6, wherein a bent portion formed by the plurality of straight paths of each of the gauge bars (200) includes an elastic material (E), the elastic material (E) being formed in a spherical shape.

8. The battery module of claim 1, wherein each of the gauge bars (200) is formed as an extension of a general curve.

\* \* \* \* \*